United States Patent [19]

Good

[11] Patent Number: 4,594,836
[45] Date of Patent: Jun. 17, 1986

[54] APPARATUS AND METHOD FOR LOADING PLASTIC TUBING WITH BALES

[76] Inventor: Maynard L. Good, 23257 County Rd., 18 East, Rte. 7, Elkhart, Ind. 46514

[21] Appl. No.: 633,138

[22] Filed: Jul. 23, 1984

[51] Int. Cl.$^4$ .............................................. B65B 9/00
[52] U.S. Cl. ........................................ 53/459; 53/249; 53/567; 53/576; 100/188 R; 100/233; 100/243; 100/295; 141/114; 414/24.5
[58] Field of Search ................ 53/459, 567, 576, 255, 53/258, 249, 566, 570; 141/10, 114, 313, 390; 414/24.5, 111; 100/233, 243, 295, 188 R

[56] References Cited

U.S. PATENT DOCUMENTS

| | | | |
|---|---|---|---|
| 2,613,021 | 10/1952 | Bowes | 53/249 |
| 3,380,220 | 4/1968 | Jennings et al. | 53/24 |
| 3,389,533 | 6/1968 | Tipper et al. | 53/134 |
| 3,390,509 | 7/1968 | Kamp | 53/258 |
| 3,546,829 | 12/1970 | Lonergan | 53/258 |
| 3,621,638 | 11/1971 | Grocke | 53/567 |
| 3,650,298 | 3/1972 | Delmar | 138/103 |
| 3,662,514 | 5/1972 | Goss | 43/37 |
| 3,802,337 | 4/1974 | St-Hiliare | 100/188 R |
| 3,983,914 | 10/1976 | Benson | 141/390 |
| 4,076,138 | 2/1978 | Honimichl | 414/24.5 |
| 4,224,781 | 9/1980 | Salenbo | 53/249 |
| 4,261,676 | 4/1981 | Balling, Sr. | 414/24.5 |
| 4,473,990 | 10/1984 | Thimon | 53/567 |

FOREIGN PATENT DOCUMENTS

| | | | |
|---|---|---|---|
| 2249225 | 4/1974 | Fed. Rep. of Germany | 53/567 |
| 2151116 | 8/1978 | Fed. Rep. of Germany | |

Primary Examiner—John Sipos
Assistant Examiner—Donald R. Studebaker
Attorney, Agent, or Firm—Arlyce R. Stearns

[57] ABSTRACT

A transportable bagging apparatus for continual, sequential loading of individual bales of agricultural products such as grass, alfalfa, corn stalks, hay, etc., into plastic tubing. The apparatus can be towed by an ordinary farm tractor or other vehicle, and can be loaded with any fork-type bale carrier or loader. A removably mounted bracket delivers plastic tubing from a roll over one of opposite open ends of a vertically positioned, pivotally mounted drum on the apparatus. When the entire roll of plastic tubing is gathered over the drum outer surface and tied over one of the drum's opposite open ends, the drum is then pivoted to a horizontal operating position with the opposite open end facing a bale engaged by a carriage. The engaged bale activates a hydraulic cylinder to force a telescoping ram against the opposite face of the carriage. This causes the engaged bale to enter the drum and load into the plastic tubing. A dropgate extension on the carriage ejects the last bale from the drum to clear the apparatus.

23 Claims, 15 Drawing Figures

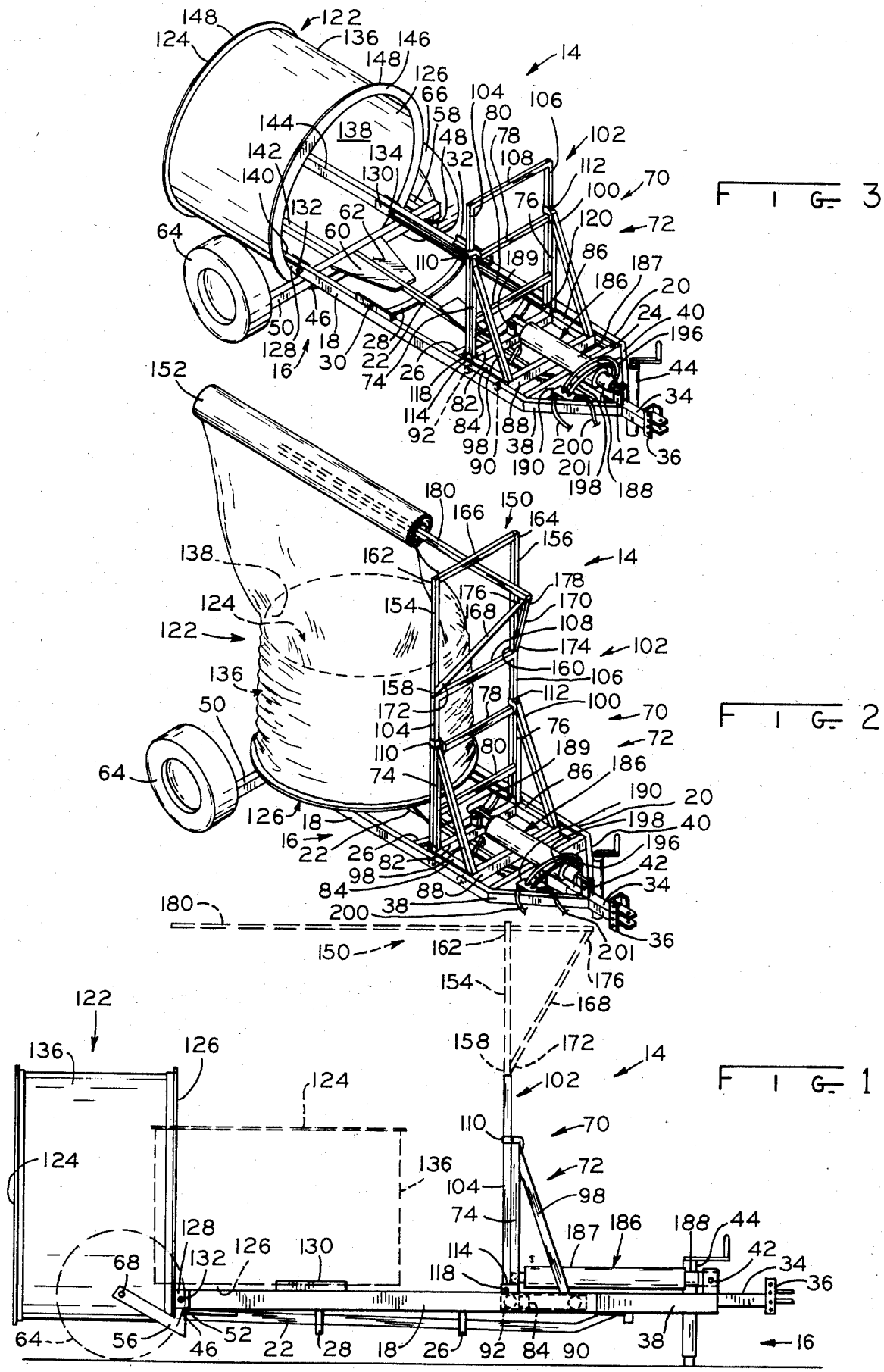

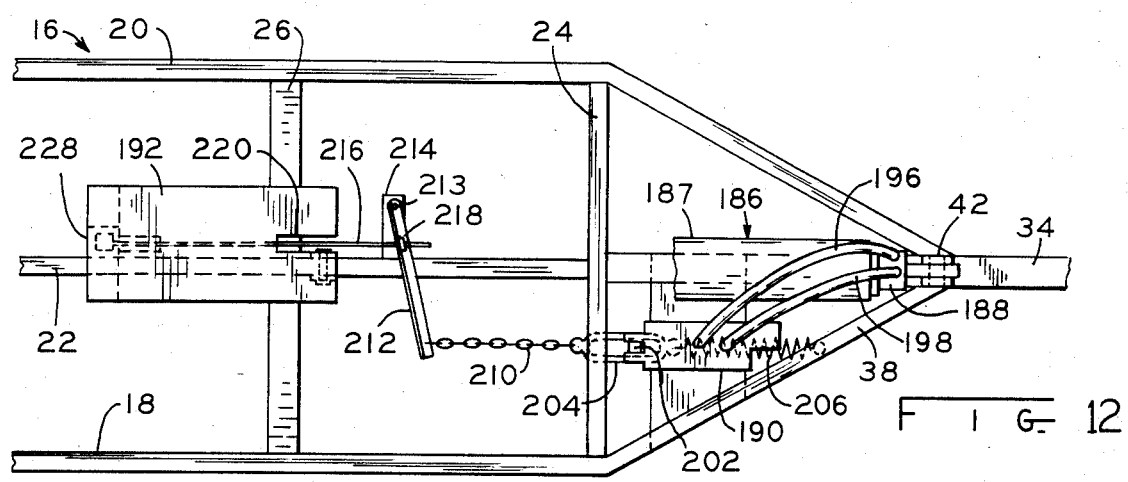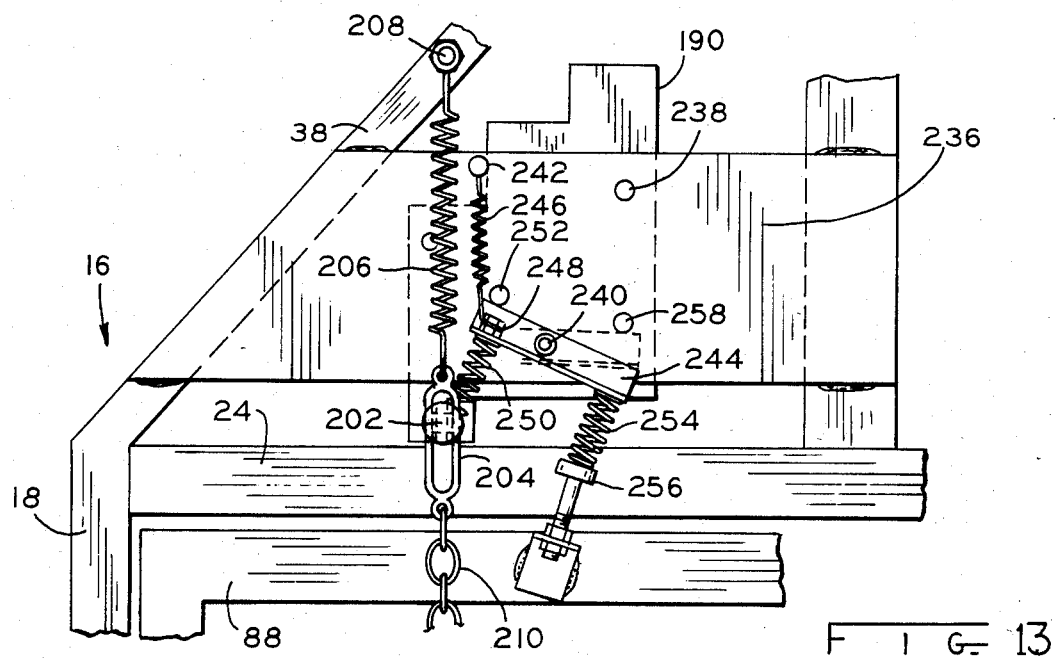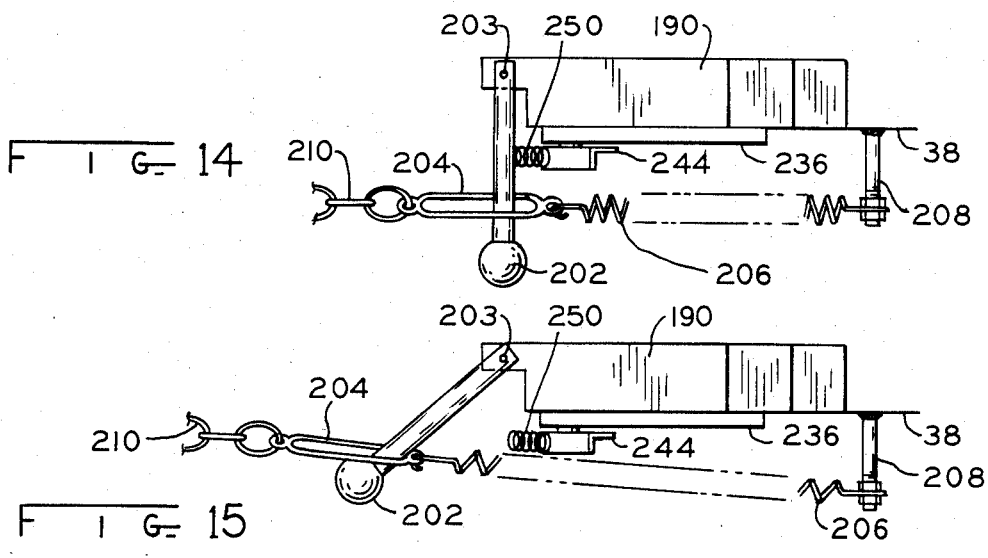

APPARATUS AND METHOD FOR LOADING PLASTIC TUBING WITH BALES

BACKGROUND OF THE INVENTION

1. Field of the Invention

This invention relates generally to an apparatus and method for bagging bales, and more particularly to an apparatus and method for automatically sequentially bagging bales of agricultural products in a continuous process.

Traditionally, bales of agricultural products such as grass, hay, corn stalks and the like convert into desired silage during storage in a sealed silage system such as a silo. Another method of producing silage which also improves the quality of forage comprises bagging such bales in plastic bags. This eliminates the need for a costly silo, expensive equipment or dedicating otherwise limited financial resources to maintain a permanent storage structure. The apparatus of the present invention for loading plastic bags with bales uses conventional agricultural equipment such as a three-point hitch with a common farm tractor and any fork-type bale carrier as well as plastic tubing having sufficient interior diameter to accommodate large bales of agricultural products.

Typically, devices available for bagging bales comprise a front-end loader modified to pick up and transport individual bales to the desired storage area and to hold the bale aloft while other people slip a plastic bag over the bale. The bagged bale is then tightly tied and stored, and the empty front-end loader returns to the field to repeat the process until all bales are bagged and stored. Such a process is inefficient because it requires excessive hand labor and plastic to completely seal and store the bale. This inefficiency greatly increases the operating expenses because more plastic is used than is actually needed and extra man-power is wasted while waiting for the tractor driver to retrieve and position another bale.

Bales of agricultural products are difficult to manage because of their density and size. Automatic bale loading and transporting devices comprising chain conveyors having lugs tend to break the bale bindings which causes the bales to fall apart. In addition, conveyors generally do not efficiently or reliably engage bales, thus, there is increased spacing between the bales on the conveyor, and this reduces the storage capacity of plastic tubing when bagging multiple bales.

Some apparatus for handling bales of agricultural products tilt an entire bale support structure to transfer the bales to their storage area. Such equipment requires many working parts which are subject to malfunction. A tiltable support structure for large cylindrical bales of agricultural products is not only cumbersome, but also requires large work areas and strong pivoting devices to accommodate the tilting.

Other continuous packaging systems are known which convey articles into a tubular packaging material held open by some device. A reel of the tubular packaging material is usually threaded around guiding or idler rolls onto or in proximity with the opening device, and a conveying means such as a shuttle or a funnel extends into the tubular material through the opening structure to insert the article into the tubing. In such systems, the conveying means such as a shuttle or a funnel must be mounted in close registration with the structure holding the tubular packaging material ready for filling. Any realigning would, therefore, be not only expensive, but also time consuming.

SUMMARY OF THE INVENTION

The present invention overcomes many of the problems and disadvantages presently incurred in the industry by providing an automatic bagging apparatus for bales of agricultural crops such as alfalfa, hay, corn stalks and the like. The present invention automatically loads plastic tubing with cylindrical bales of agricultural products for storage to produce silage nutritionally superior to previous bulk silage without requiring the expensive permanent structures or complicated expensive machinery for chopped silage. This invention can load preferably up to twenty-three, four-foot bales into a preferably one hundred foot long plastic tube. Because of this invention'increased efficiency, this system requires less of an investment for storing agricultural bales because: one man can load the tubing with bales; loading multiple bales in one tube uses less plastic than a system which bags each bale individually; and each bale requires less than one minute to be loaded into the plastic tubing.

The apparatus of this invention can be transported to the site desired for storing the bagged bales and it can be operated either manually or automatically. A quantity of bales brought by a flat-bed or truck can be transferred from the truck individually to the base frame of the apparatus by a traditional front-end loader or any fork-type bale carrier. The bales are individually, sequentially transferred from the supporting bed of the apparatus into the opened tubing and cleared from the apparatus to remain in place in their loaded storage position. There are a minimum number of moving parts to this invention, and many of the parts are removably attached for ease of maintenance. There are no lugs as on a conveyor belt which would cause the bales to be torn apart. This invention is energy, material and man-hour efficient.

In one form of the invention, there is provided a transportable base for supporting a bale between a slidably mounted structure for engaging the bale and a pivotally mounted bale guiding structure on the bale supporting base. Plastic tubing gathered on and secured over one end of the pivotal bale guiding structure is held open to receive a bale transferred by the bale engaging structure. A power means mounted on the bale supporting base operatively connects to one of the bale engaging structure and the bale guiding structure for moving the connected structure in a longitudinal direction relative to the other so that the engaged bale is transferred from the elongate frame through the bale guiding structure and into the plastic tubing. In accordance with the present invention, a bale can be stored in plastic tubing by loading the bale onto the transportable base and engaging the bale with a movably mounted bale engaging structure. Applying force to one of the bale engaging structure and the bale guiding structure causes such structure to move longitudinally with respect to the other structure until the structures meet and the engaged bale enters into the opposite open end of the bale guiding structure which holds the prepared plastic tubing.

It is an object of this invention to provide an apparatus and method for automatically loading plastic tubing with bales.

It is another object of this invention to provide more economical silage and dry hay preservation as well as anhydrous application requiring fewer, less expensive, structures, equipment and time.

It is another object of this invention to provide an apparatus for loading plastic tubing with multiple bales to increase the efficiency of the system by using less plastic.

It is yet another object of this invention to provide an automatic bagging apparatus for loading plastic tubing with bales which requires less man power. The apparatus of the present invention can be operated by one person instead of requiring two or three people.

It is a further object of this invention to provide an automatic apparatus for sequentially loading plastic tubing with bales which is readily adaptable to accommodating bales of various diameters.

It is a still further object of this invention to provide an automatic apparatus for loading plastic tubing with bales which can be used with conventional bale handling equipment.

The above-mentioned and other features and objects of this invention, and the manner of attaining them will become more apparent, and the invention itself will be best understood by reference to the following description of embodiments of the invention taken in conjunction with the accompanying drawings.

BRIEF DESCRIPTION OF THE DRAWINGS

FIG. 1 is a side elevational view of a preferred embodiment of the present invention;

FIG. 2 is a side perspective view of the embodiment in the transport and bag loading position;

FIG. 3 is a side perspective view of the embodiment in the operating position;

FIG. 12 is a top plan of the automatic trip detail;

FIG. 13 is an enlarged fragmentary view of the valve plate underside;

FIG. 14 is an enlarged fragmentary side view of the valve handle in reverse position; and FIG. 15 is an enlarged fragmentary side view of the valve handle in first detente position.

DETAILED DESCRIPTION OF A PREFERRED EMBODIMENT

Figure 5:
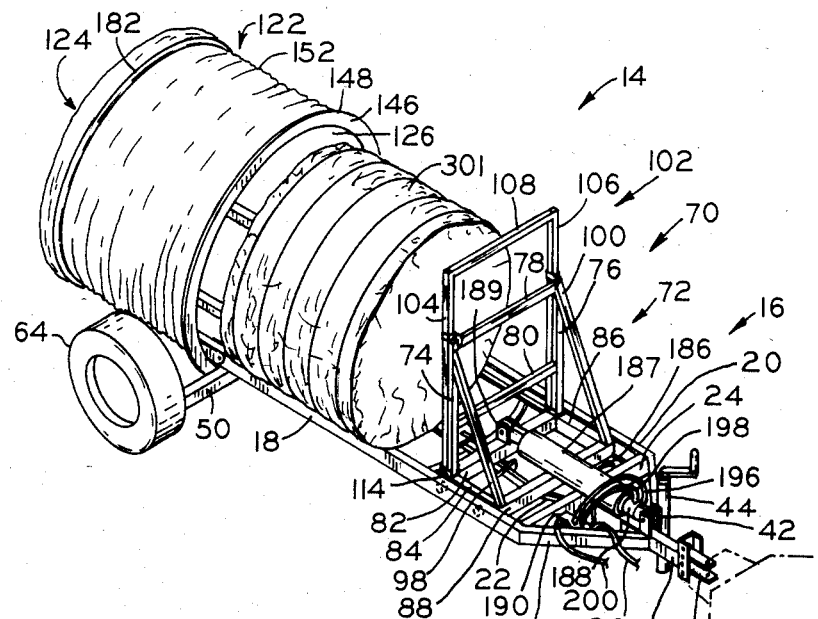
FIG. 5 is a perspective view of the embodiment in operation transferring a bale into the bale guide.
Figure 4:
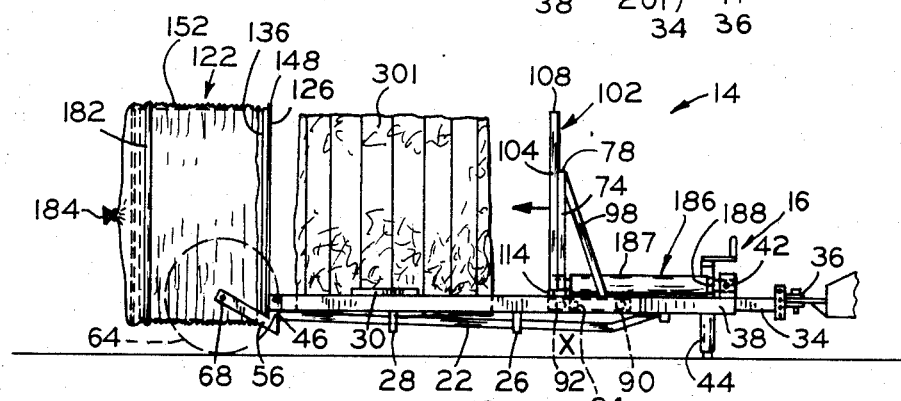
FIG. 4 is a side elevational view of the embodiment in the operating position.
Figure 6:
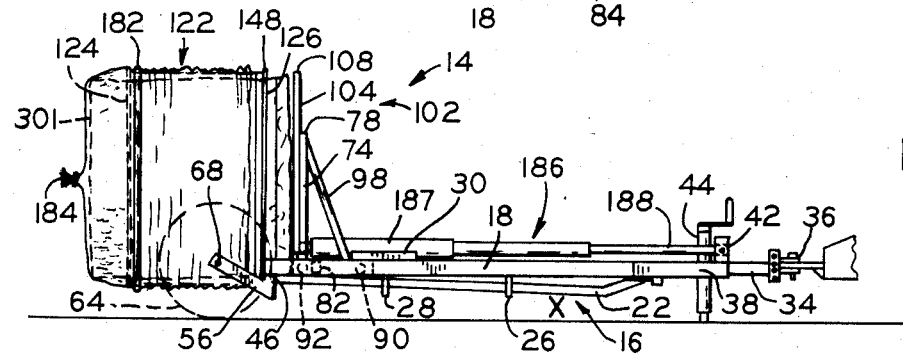
FIG. 6 is a side elevational view of the embodiment with the telescoping cylinder system extended.
Figure 7:
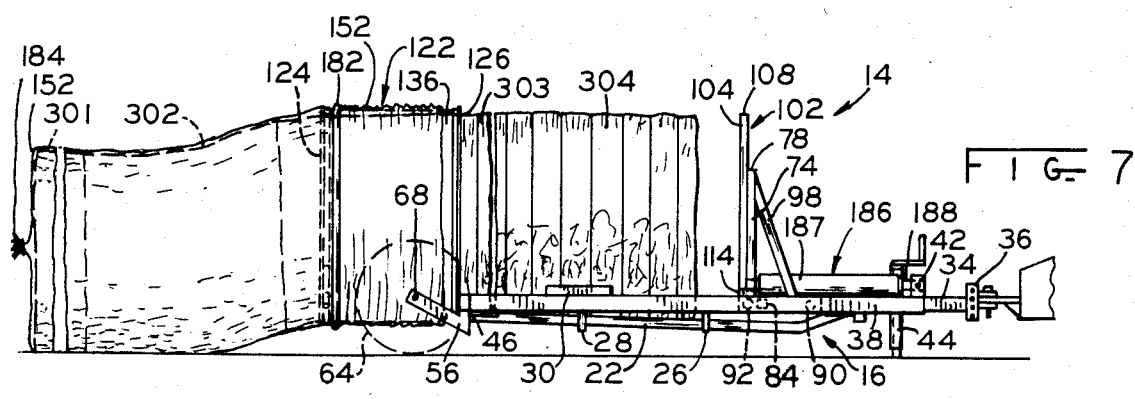
FIG. 7 is a side elevational view with the embodiment in operation.

Referring now to FIGS. 1-3 of the drawings, there is shown the bale loading apparatus of the invention, generally indicated at 14. Apparatus 14 has transportable base frame 16, preferably of strong, non-corrosion material such as structural steel, including spaced-apart lateral rails 18, 20 preferably having a channel configuration and center rail 22, each connected at its forward limit by cross member 24. Spaced-apart frame bows 26, 28, each having opposite ends, support center rail 22 and hold lateral rails 18, 20 in place to prevent misalignment. An opposite end of each of frame bows 26, 28 connects to one of lateral rails 18, 20, intermediate opposite ends of lateral rails 18, 20. Bale rakes 30, 32 secured to lateral rails 18, 20 respectively, intermediate frame bows 26, 28, facilitate removal of each bale transferred from the fork-type bale carrier.

Tongue 34 extends rearwardly from conventional hitch 36 to connect together forward ends of lateral rails 38, 40 extending centrally from opposite ends of cross-member 24. Upper surface of tongue 34 has cylinder bracket 42, and frame stand 44 (FIG. 1), a commercially available agricultural screw-type jack, is positioned under either of lateral rails 38, 40. A forward end portion of conventional hitch 36 connects to a towing vehicle such as a farm tractor 15 (FIGS. 5-9).

Rail supports 46, 48 attach to back end portions of parallel rails 18, 20, respectively, (FIGS. 1 and 3, only one is shown) at axle 50. Frame axle gussets 52, 54, attach to lateral rails 18, 20 at rail supports 46, 48, respectively. Axle extensions 56, 58, respectively, (FIGS. 1, 4, 6-10), extend from opposite ends of axle 50. Bale slides 60, 62 (FIG. 3) attach on either side of center rail 22 at its connection with axle 50. Bale slides 60, 62 overcome obstruction by axle 50 to the transfer of a bale from center rail 22. Wheels 64, 66, rotatably connected by axle pins 68, 69 (FIG. 10), facilitate transporting apparatus 14.

The sturdy construction of base frame 16 including frame bows 26, 28 and frame axle gussets 52, 54 provide substantial support to receive and hold a heavy cylindrical bale of an agricultural crop. Bale slides 60, 62 provide for smooth transfer of the supported cylindrical bale from center rail 22 over axle 50 and into prepared plastic tubing as will be described hereinbelow.

Referring now to FIGS. 3-9, carriage 70, preferably an all steel supported frame, is slidably and removably mounted in lateral rails 18, 20. Carriage 70 engages a cylindrical bale supported on center rail 22 over frame bows 26, 28. Carriage 70 transfers the engaged bale from center rail 22 into the prepared plastic tubing as described hereinafter.

Carriage 70 includes bulkhead member 72 having spaced-apart vertical members 74, 76, cross members 78, 80 each having opposite ends. Opposite ends of cross members 78, 80 connect vertical members 74, 76 at their upper portion and intermediate lower portion respectively. The carriage 70 further includes a first cross member 82, a pair of outside rails 84 and 86 each having a opposite forward and rearward end portions, a second cross member 88, flange wheels 90, 92, 94, 96 (only two are shown, FIGS. 1 and 3) and a pair of support members 98 and 100 each having opposite ends. Opposite ends of the first cross member 82 connect to one of outside rails 84, 86 (FIGS. 2, 3 & 5) at their rearward portion. Outside rails 84, 86 correspond to lateral rails 18, 20, respectively. Opposite ends of second cross member 88 (FIGS. 2, 3 & 5) connect to front end portions of outside rails 84, 86. Flange wheels 90, 92 and 94, 96 are rotatably mounted to front and rear portions of outside rails 84, 86, and ride inside channels of lateral rails 18, 20. Spaced-apart inclined support members 98, 100 each have a lower end connected to a corresponding one of opposite ends of the second cross member 88, and upper ends each connected to upper portions of vertical members 74, 76, respectively.

Figure 8:
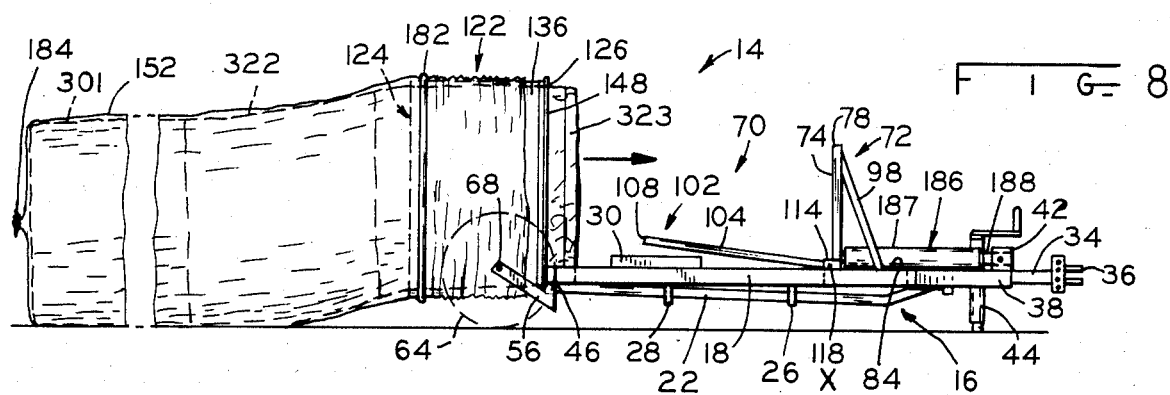
FIG. 8 is a side elevational view of the embodiment with dropgate extended.
Figure 9:
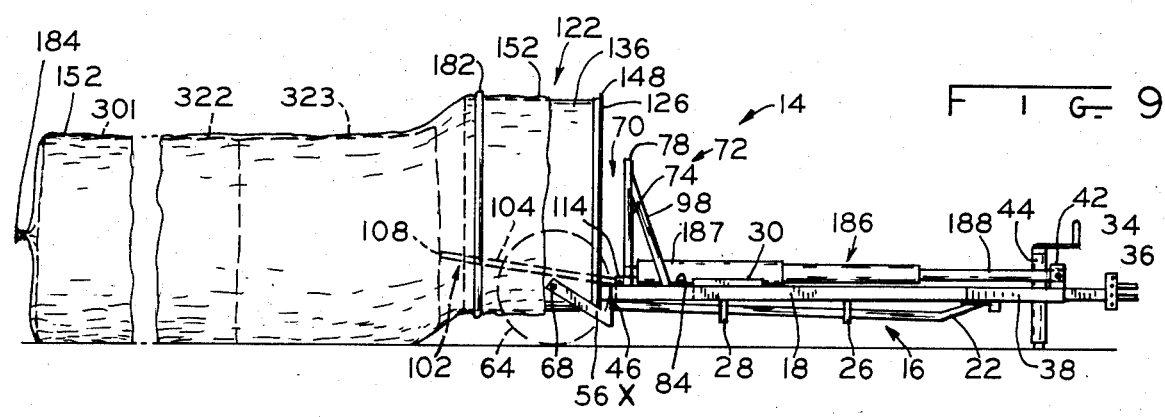
FIG. 9 is a side elevational view of the dropgate in a horizontal operating position.
Figure 10:
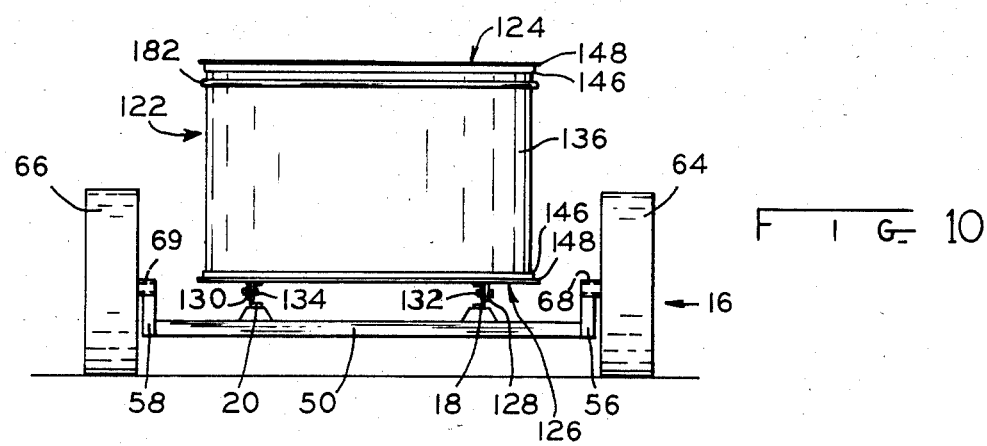
FIG. 10 is a rear elevational view of the embodiment in transport position.

Thus it will be seen that carriage 70 having flange wheels 90, 92 and 94, 96, confined within the channel of each of lateral rails 18, 20, respectively, provides for both the engagement of and the longitudinally guided movement of a cylindrical bale supported on center rail 22. Apparatus 10 can transfer a bale from the support frame 16 by applying force against the carriage 70 and causing the carriage 70 with an engaged bale to move rearwardly on support frame 16 through a bale guide and into plastic tubing. Alternatively, when the resistance of the transferred bales rearward of apparatus 10 exceeds the force applied to the carriage 70, the force will cause the farm tractor 15 or other towing vehicle hitched to the apparatus 10 to move forwardly as illustrated in FIGS. 8 and 9. As the farm tractor 15 moves forward, it pulls the transportable base frame 16 forwardly while the force applied to the carriage 70 prevents forward movement of the engaged bale supported on the transportable base frame 16. Consequently, as the transportable base frame 16 moves forwardly, it pulls plastic tubing over the engaged bale supported on the transportable base frame 16 as will be discussed further hereinbelow. Support members 98, 100 brace bulkhead member 72 in a substantially vertical position relative to base frame 16, and the removable mounting of carriage 70 facilitates maintenance.

The bulkhead member 72 includes a bale ejector 102 having a top end portion and a bottom portion. Bale ejector 102 is pivotally connected to bulkhead member 72. The bale ejector 102 includes a pair of spaced-apart vertical members 104 and 106 with attached securing members 110 and 112, respectively, only one is required, a cross member 108, and a pair of hinges 114 and 116 (only one is shown) having hinge pins 118 and 120, respectively. The opposite ends of cross member 108 connect the top end portion of vertical members 104, 106. Securing members 110, 112 secure vertical members 104, 106, respectively, to vertical members 74, 76, respectively, to maintain the bale ejector 102 in a substantially vertical attitude adjacent and in a plane parallel with one face of the bulkhead member 72. Hinges 114, 116, only one is shown (FIG. 3), attach to vertical members 104, 106, respectively, by hinge pins 118, 120, respectively. FIGS. 8 and 9 illustrate bale ejector 102 in its substantially horizontal position engaging a cylindrical bale (FIG. 9) into prepared plastic tubing as described hereinbelow.

Referring now more specifically to FIGS. 1–3 and 10, drum 122 having opposite open ends 124, 126, pivotally and removably mounts on transportable base frame 16 at drum hinge plates 128, 130 attached to the back outer portions of lateral rails 18, 20 by drum hinges 132, 134. Drum 122 has outer surface 136, and inner surface 138 strengthened by stiffeners 140, 142, 144. Drum 122 has annular flange 146 with outer rim 148 peripherally supporting outer surface 136. Removable mounting of drum 122 facilitates interchangeability of drums having adequate diameters, preferably from 4 ft., 6 in. to 6 ft., 6 in. which will accommodate passage of the bales of agricultural crops being packaged. As shown by dashed lines in FIG. 1, drum hinges 132, 134 allow drum 122 to pivot to a vertical, transport position from its horizontal, operating position. FIG. 2 shows drum 122 pivoted to its vertical transport position to receive plastic tubing around outer surface 136.

Referring to FIGS. 1 and 2, roll support device 150 supports a role of plastic tubing 152. Preferably, all material used for roll support device 150 is structural steel or non-corrosive metal. Roll support device 150 includes spaced-apart lateral vertical supports 154, 156 each having lower end portions 158, 160 respectively. Roll support device 150 removably mounts on carriage 70 by inserting lower end portions 158, 160 into upper ends of vertical members 104, 106, respectively. Lateral vertical supports 154, 156 have upper ends 162, 164, respectively, connected by opposite ends of cross member 166. Braces 168, 170 have lower ends 172, 174, respectively and upper ends 176, 179, respectively. Lower ends 172, 174 connect to vertical supports 154, 156, respectively, preferably approximately twelve inches above lower ends 158, 160, respectively, and extend centrally and upwardly whereby upper ends 176, 178 connect together preferably approximately twenty inches forward of cross member 166.

Spindle 180, a horizontal tube, connects with upper edges 176, 178 and extends therefrom preferably approximately seventy-six inches rearwardly beyond cross member 166. FIG. 2 clearly shows spindle 180 holding a roll of tubular plastic 152 unwinding onto drum 122. When all of plastic tubing 152 has been gathered over outer surface 136, one end of plastic tubing 152 is pulled under bag retainer 182 (FIG. 8), girding outer surface 136, over open end 124 and closed with bag closure 184 in preparation for loading with bales. Roll support device 150 is then easily removed from bale ejector 102 for convenient storage by lifting vertical supports 154, 156 out of vertical members 104, 106, respectively. As bales are loaded into plastic tubing 152, bag retainer 182 controls the flow of plastic tubing 152 from outer surface 136 to prevent wrinkling or tangling of the plastic.

Telescoping cylinder system 186 includes hydraulic cylinder 187 and ram 188. Ram 188 securely mounts on cylinder bracket 42, and hydraulic cylinder 187 securely mounts on bracket 189. Bracket 189 mounted on cross-member 82 and cylinder bracket 42 mounted on tongue 34 hold telescoping cylinder system 186 in alignment over center rail 22. As will be explained hereinafter, telescoping cylinder system 186 is activated by valve 190 (FIGS. 2, 3, 5, 11–15), which is commercially available from Cross Manufacturing, Inc., Lewis, Kans., connected to trip plate 192. Trip plate 192 is releasably and pivotally mounted above center rail 22. The weight of a loaded bale trips trip plate 192, and this actuates valve 190 to operate telescoping cylinder system 186.

Hydraulic cylinder 187 forces bales 301, et seq. into drum 122, as telescoping cylinder system 186 reaches full stroke. Pressure then releases and telescoping cylinder system 186 automatically retracts and stops. Base frame 16 can then receive next bale 302, et seq. Bale 302 (FIG. 7) pushes bale 301 out of drum 122 into prepared plastic tubing 152, thereby causing bale 301 to lie encased in plastic tubing 152 rearwardly of apparatus 14.

Telescoping cylinder system 186 pushes third bale 303 (FIG. 7) until the friction resistance of bales 301, 302 and 303 is greater than the rearward thrust of telescoping cylinder system 186. From then on, bale bagging apparatus 14 is simply a bag holder that strips plastic tubing 152 over bales 303 et seq. Carriage 70 holds bale 303 et seq. in place, and the rearward thrust of telescoping cylinder system 186 finds release by pushing a tractor (not shown), which causes transportable base frame 16 of apparatus 14 to move forward. Upon release of both or either of securing members 110, 112, bale ejector 102 drops to its substantially horizontal position to eject last bale 323 from drum 122 into plastic tubing 152 (FIG. 9). Thus, dropgate 102 clears apparatus 14 and completes the loading of plastic tubing 152 with bales.

Hoses 196, 198 connect telescoping cylinder system 186 to valve 190, (FIGS. 2, 3, 5, 11, 12), and hoses 200, 201 (FIGS. 2, 3, and 5) connect valve 190 to a hydraulic power source such as a farm tractor, truck, etc. (not shown). Valve 190 mounts between tongue 34 and one of forward lateral rails 38, 40 adjacent forward portion of telescoping cylinder system 186 (FIGS. 2, 3, 5, 11–13). Valve handle 202 pivotally connects to valve 190 by pin 203, (FIGS. 11, 14 and 15), and descends from valve 190 through yoke 204. One of opposite ends of stabilizing spring 206 attaches to bolt 208, and the other opposite end attaches to forward end of yoke 204 (FIGS. 11, 13–15).

Stabilizing spring 206 has three functions: it always holds yoke 204 in position for forward movement; then pulls yoke 204 high up on valve handle 202 while valve handle 202 is cocked in the working mode and out of way for reversing action; and brings trip plate 192 back to receiving position when the bale clears. Back portion of yoke 204 is preferably within ⅛" of valve handle 202 when valve handle 202 is in reverse position.

Figure 11:
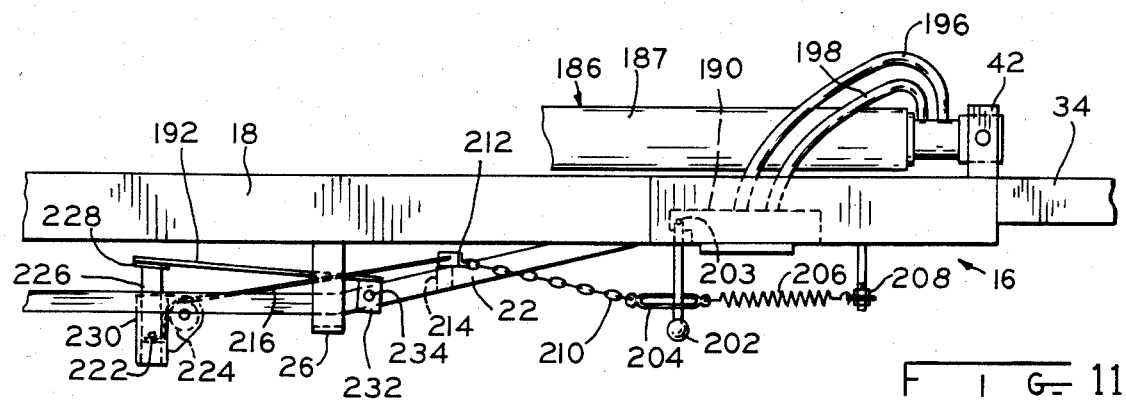
FIG. 11 is an enlarged fragmentary side view of the embodiment showing automatic trip detail.

Rearward portion of yoke 204 attaches to forward end of yoke chain 210, and rearward end of yoke chain 210 attaches to one portion of lever 212 (FIGS. 11 and 12). Bolt 213 pivotally mounts lever 212 on lever extension 214 (FIGS. 11 and 12), preferably extending approximately four inches laterally from center rail 22 intermediate cross member 24 and frame bow 26. Cable 216 attaches to another portion of lever 212 with cable clamp 218 and extends rearwardly through cable slot 220, which is disposed at one end of trip plate 192, and under trip plate 192, around pulley 224 (FIG. 11) and through cable aperture 222 on trigger 226, to which cable 216 is secured. Pulley 224 securely attaches by any suitable securing means such as welding, bolting, etc., to the forward side of trigger housing 230 mounted on center rail 22 intermediate frame bows 26, 28 and under a rear portion of trip plate 192.

Trip maintainer 232 (FIG. 11), secured to the underside of a forward portion of trip plate 192 adjacent cable slot 220, holds trip plate 192 in alignment over center rail 22. A releasable fastening means, such as a cotter pin (not shown) placed through maintainer aperture 234, secures trip plate 192 in position over center rail 22. Trigger plate 228 transfers pressure from trip plate 192 to trigger 228. Trigger plate 228 is mounted by any appropriate securing means, such as welding, bolting, etc., on trigger 226 in trigger housing 230.

The weight of a bale loaded on base frame 16 depresses trip plate 192 against trigger plate 228, which causes trigger 226 to descend into trigger housing 230. As trigger 226 enters trigger housing 230, it creates tension on cable 216 which pulls lever 212. Lever 212 then pulls yoke chain 210, yoke 204, and valve handle 202 rearwardly. As valve handle 202 pivots rearwardly, it actuates valve 190. Yoke 204 provides free movement of travel for valve handle 202 to change between operating and neutral positions.

FIG. 13 illustrates valve undersurface plate 236 having opposite sides; one of the opposite sides attached to tongue 34 and the other opposite side attached to one of forward lateral rails 38, 40. Valve bolts 238, 240, 242 secure valve 190 to the upper surface of valve plate 236. Valve bolt 240 pivotally mounts pivot plate 244 to valve plate 236 and to valve body 190.

One opposite end of spring 246 attaches to valve bolt 242 and the other opposite end of spring 246 attaches to spring clamp 248 on one end portion of pivot plate 244. Spring 250 is free to engage valve handle 202. Spring 246 holds pivot plate 248 against stop 252 so that spring 250 will always be in correct position to receive and engage valve handle 202 to snap valve handle 202 back to neutral position. Yoke 204 engages valve handle 202 and pulls it into the working mode where it cocks and stays for the power stroke of telescoping cylinder system 186. When telescoping cylinder system 186 reaches the end of its stroke, it builds maximum pressure and valve 190 automatically reverses itself and retracts telescoping cylinder system 186 attached to carriage 70. As telescoping cylinder system 186 approaches the end of its reverse stroke, return trigger 256 strikes and engages spring 254 on pivot plate 248.

FIG. 13 illustrates this exact moment in the cycle: spring 246 holds pivot plate 244 in exact position as spring 250 just touches valve handle 202, and return trigger 256, attached to the underside of carriage front cross member 88, is ready to compress springs 250 and 254 to snap valve handle 202 into neutral position. Pivot plate 244 is forced against stop 258 and spring 254 remains tightly held by return trigger 256. Dashed lines show the position of pivot plate 244 only in full neutral position. This arrangement of springs, stops and trigger presents a stationary position so that at no time can valve handle 202 move to an operating mode except by deliberate action on trip plate 192 or by hand movement of valve handle 202. An internal spring (not shown) in valve 190 prevents valve handle 202 from moving into the forward mode except by some forceful and deliberate act.

It will now be seen that this invention provides an automatic bagging apparatus for sequentially loading individual cylindrical bales of agricultural products into plastic tubing. By reason of the slidably mounted parts engaging a loaded bale, as well as the removable mounting of roll support 150 for delivering the plastic tubing and the pivotal mounting of the drum holding the tubing open to receive the bale, this apparatus is easily operated by one man, and uses less plastic than would be needed by bagging each bale individually. The apparatus of this invention is extremely efficient because it eliminates the need to employ extra people to hold bags open to receive bales.

Given in the following are specifications of a typical working embodiment of this invention, these are exemplary only and not limitative of the invention. The scope of the invention is given in the appended claims. Rails 18, 20, 38, 40, 84, 86, & 88, and cross member 24 are preferably a 4" channel rail. Frame bows 26, 28, rail 22 bulkhead member members 74, 76, 78, 80, 98 & 100 and bale ejector 108 are preferably 1 ½" square tubing having a heavy wall. Tongue 34, rail supports 52, 54, axle 56 and axle extensions 62 and 64 are preferably of 3" square tubing having a ¼" wall. Securing members 110 and 112 are preferably 2" square tubing having a 3/16" wall. Flange outer rim 148, roll support 150 members 154, 156, 166, 168 and 170 are preferably 1" square tubing having an 18 gauge wall. Spindle 180 is preferably of 1 ½" round tubular steel.

The following features are steel plates having the following dimensions: cylinder bracket 42 is preferably 3" by 2" by 1"; frame axle gussets 58, 60 are preferably 4" by 5" by 10 gauge; bale slides 68, 70 are preferably 10" by 20" by 14 gauge; hinges 122, 124 are preferably 3 ½" by 2 ½" by ½"; and hinge plates 132, 134 are preferably 2" by 6 ½" by ¼".

Bag retainer 182 is preferably 1" diameter flexible, circular plastic hose.

While there have been described above the principles of this invention in connection with a specific apparatus, it is to be clearly understood that this description is made only by way of example and not as a limitation to the scope of the invention.

What is claimed is:

1. An apparatus for loading bales into plastic tubing, comprising:
   an elongate frame;
   at least one wheel for said frame;
   at least one axle rotatably supporting said wheel and mounted under said elongate frame;
   spaced-apart elongate rails including opposite outside rails and at least one rail having a channel configuration for a guide rail;
   at least one concave cross member having opposite ends with each end connected to one of said outside rails adapted for providing passage for a cylindrical bale on said elongate frame;
   a bale guiding means having opposite communicating open ends pivotally mounted on said elongate frame for selective movement between a first position and a second position, with one of said opposite open ends selectively insertable into one end of the plastic tubing for guiding said bale into the plastic tubing;
   a carriage movably connected to said guide rail for engaging the bale and including:
      a bulkhead member having an upper end portion, means for supporting said bulkhead member in a generally vertical attitude with respect to said guide rail, and
      a bale ejector with an upper end portion generally vertically disposed with respect to said guide rail and pivotally attached to said bulkhead member for selective extending engagement of a bale through said bale guiding means;
   means mounted on said elongate frame and operatively attached to said carriage for moving one of said carriage and said elongate frame in a generally longitudinal direction for selectively changing the relative longitudinal position of one of said carriage and said bale guiding means opposite open ends for loading the bale into the plastic tubing from said elongate frame; and
   a roll support device for dispensing plastic tubing, said roll support device being selectively removably mounted on said carriage.

2. A method for loading bales into plastic tubing, comprising the steps of:
   positioning a roll support device having a roll of plastic tubing thereon over a bale guide having opposite open, communicating ends therein;
   positioning the bale guide in a first generally vertical position on a transportable base frame, whereby one of the open ends is disposed generally upwardly;
   dispensing the plastic tubing from the roll support device over the one open end of the bale guide and inserting the one open end of the bale guide into one end of the plastic tubing;
   gathering a predetermined length of the plastic tubing onto an outer surface of the bale guide around the one open end;
   retaining the flow of the plastic tubing from the outer surface with a bag retainer;
   pivoting the bale guide to a generally horizontal position on the longitudinal axis of a transportable elongated frame;
   removing the roll support device;
   securely closing the one end of the plastic tubing over the one open end of the bale guide for containing bales;
   loading a bale onto the elongated frame facing the other one of the open ends of the bale guide;
   engaging the bale with a carriage guided on the elongated frame;
   applying force against the carriage for causing the carriage to contact the other one of the open ends of the bale guide; and
   guiding the engaged bale from the elongated frame into the plastic tubing.

3. A method for loading bales into plastic tubing, comprising the steps of:
   positioning a transportable longitudinal frame in a desired location for the tube of bales;
   pivoting a bale guide having opposite communicating, open ends therein mounted on frame into a generally vertical position, whereby one of the open ends is disposed generally upwardly;
   mounting a roll support device frame on the transportable longitudinal frame;
   placing a roll of plastic tubing on the roll support device over the bale guide;
   dispensing a predetermined length of the plastic tubing over the one open end of the bale guide and inserting the same into one end of the plastic tubing;
   gathering a predetermined length of the plastic tubing on an outer wall of the bale guide;
   retaining the flow of the plastic tubing from the outer wall with a bag retainer;
   removing the roll support device frame from the longitudinal frame;
   pivoting the bale guide to a generally horizontal position substantially coaxial with the base frame, whereby one of the opposite open ends of the bale guide is disposed generally toward a carriage on the base frame;
   securely closing the one end of the plastic tubing over the other opposite open end of the bale guide for containing transferred bales;
   serially loading individual bales onto the longitudinal frame with one end of each bale facing the other one of the bale guide open ends and an opposite end of the bale adjacent a carriage movably mounted on the longitudinal frame;
   engaging the opposite end of the bale with the carriage guided on the longitudinal frame;
   applying a force to move the carriage toward the other open end of the bale guide, whereby the bale is caused to enter into the plastic tubing through the other open end of the bale guide; and
   releasing the force applied against the carriage, whereby the carriage and the bale guide separate to provide for loading another bale onto the base frame.

4. An apparatus for loading bales into plastic tubing comprising:

a transportable base having at least one wheel, at least one axle rotatably supporting said wheel, and a frame mounted on said axle, said frame having a plurality of spaced-apart rails with at least one of said rails on each of opposite sides of the longitudinal axis of said frame and at least one cross member having opposite ends with each of said ends being rigidly connetted to a respective one of said spaced-apart rails, and wherein at least one of said rails has a channel configuration for guiding longitudinal movement;

a carriage mounted on said frame for engaging a bale supported thereon, said carriage including:
 a bulkhead member having opposite faces,
 means for supporting said bulkhead member in a generally vertical attitude with respect to said side rails,
 a bale ejector pivotally connected adjacent one face of said bulkhead member for selective movement between a first position and a second position.
 means for movably mounting said carriage on said frame, and
 means for dispensing plastic tubing from said carriage;

means mounted on said frame for guiding the bale into the plastic tubing; and means mounted on said frame and operatively connected to one of said carriage and said bale guiding means for moving the connected one of said carriage and said means in a longitudinal direction relative to the other one of said carriage and said means, whereby the bale is transferred from said bale supporting means into the plastic tubing.

5. An appartus for loading bales into plastic tubing comprising:
 a transportable base including:
  at least one wheel,
  at least one axle rotatably supporting said wheel, and
  a frame mounted on said axle, said frame having spaced-apart rails with at least one of each of opposite sides of a longitudinal axis of said frame, at least one cross member having opposite ends, each of said ends being secured to a corresponding one of said side rails, and wherein at least one of said spaced-apart rails has a channel configuration for guiding longitudinal movement;
 a carriage mounted on said frame and including:
  a bulkhead member having opposite faces,
  means for supporting said bulkhead member in a generally vertical attitude with respect to said side rails,
  a bale ejector having a bottom portion hingedly connected to a bottom portion of said bulkhead member to provide pivotal mounting of said bale ejector;
  means for movably mounting said carriage on said frame, and
  means for dispensing plastic tubing from said carriage;
 means mounted on said frame for guiding the bale into the plastic tubing; and
 means mounted on said frame and operatively connected to one of said carriage and said bale guiding means for moving the connected one of said carriage and said means in a longitudinal direction relative to the other one of said carriage and said means, whereby the bale is transferred from said frame into the plastic tubing.

6. An apparatus for loading bales into plastic tubing comprising:
 a transportable base including:
  at least one wheel,
  at least one axle rotatably supporting said wheel, and
  a frame mounted on said axle, said frame having spaced-apart rails with at least one on each of opposite sides of a longitudinal axis of said frame, at least one cross member having opposite ends each of said ends being secured to a corresponding one of said side rails, and wherein at least one of said spaced-apart rails has a channel configuration for guiding longitudinal movement;
 a carriage mounted on said frame and including:
  a bulkhead member having opposite faces, a top end portion and a bottom end portion,
  means for supporting said bulkhead member in a generally vertical attitude with respect to said side rails,
  a bale ejector having a top end portion a bottom portion, said bottom end portion being hingedly connected to a bottom portion of said bulkhead member to provide pivotal mounting of said bale ejector adjacent one of said opposite faces of said bulkhead member for selective movement between a first position and a second position, and wherein said top end portion of said bale ejector in one of said first position and said second position lies in a plane parallel with and superior to said bulkhead member top end portion,
  means for movably mounting said carriage on said frame, and
  means for dispensing plastic tubing from said carriage;
 means mounted on said frame for guiding the bale into the plastic tubing; and
 means mounted on said frame and operatively connected to one of said carriage and said bale guiding means for moving the connected one of said carriage and said means in a longitudinal direction relative to the other one of said carriage and said means, whereby the bale is transferred from said bale supporting means into the plastic tubing.

7. An apparatus for loading bales into plastic tubing comprising:
 a transportable base including:
  at least one wheel,
  at least one axle rotatably supporting said wheel, and
  a frame mounted on said axle, said frame having spaced-apart rails with at least one on each of opposite sides of a longitudinal axis of said frame, at least one cross member having opposite ends, each of said ends being secured to a corresponding one of said side rails, and wherein at least one of said spaced-apart rails has a channel configuration for guiding longitudinal movement therealong;
 a carriage mounted on said frame and including:
  a bulkhead member having opposite faces, a top end portion and a bottom end portion,
  means having an upper end portion attached to said bulkhead member for supporting said bulkhead member in a generally vertical attitude with respect to said side rails, a bale ejector having a top end portion and a bottom end portion, said bottom end portion being hingedly connected to said bulkhead member bottom end portion for pivotal movement between a first position and a second position and wherein said top end portion of said bale ejector in one of said first position and said second position lies in a plane parallel with and superior to said bulkhead member top end portion, a base portion having opposite ends, with one of said ends being secured to said bottom end portion of said bulkhead member and the other of said ends being secured to a lower end of said support means, and having at least one wheel attached thereto and mounted in said channel rail for reciprocating movement along said frame, and means for dispensing plastic tubing from said carriage;

means mounted on said frame for guiding the bale into the plastic tubing; and means mounted on said frame and operatively connected to said carriage for moving one of said carriage and said frame with said bale guiding means in a longitudinal direction relative to the other one of said carriage and said frame with said bale guiding means whereby the bale supported on said frame and engaged by said carriage is transferred from said frame into the plastic tubing.

8. Apparatus for loading plastic tubing with bales, comprising:

an elongate, transportable base member adapted to support and transfer round bales sequentially into plastic tubing;

a carriage member selectively mounted on said base member for sequentially engaging bales as each bale is supported on said base member and adapted to accommodate longitudinal movement of one of said carriage member and said base member relative to the other whereby said engaged bales are urged to load sequentially into the plastic tubing;

means selectively mounted on one of opposite ends of said base member for guiding said engaged bale into the plastic tubing, means for mounting said bale-guiding means for selective movement between a substantially vertical transport position and a substantially horizontal bale-loading position;

means mounted on said base member and operatively connected to one of said carriage member and said bale-guiding means for moving the connected one of said carriage member and said bale-guiding means in a longitudinal direction relative to the other, whereby said engaged bale is loaded into the plastic tubing; and a roll support device selectively mounted adjacent said bale-guiding means and adapted to dispense the plastic tubing to be gathered over one of opposite open ends of said bale-guiding means for loading said engaged bale therein.

9. Apparatus for loading bales into plastic tubing, comprising:

a transportable means for sequentially supporting and transferring bales into plastic tubing, said bale-supporting means including:
at least one wheel,
at least one axle rotatively supporting said wheel, and
an elongate frame member mounted on said axle;

means selectively mounted on said frame member for engaging bales sequentially supported on said frame member whereby said engaged bales are urged to load sequentially into the plastic tubing;

means mounted on said frame member for guiding said engaged bales sequentially into the plastic tubing and means for mounting said bale-guiding means for selective movement between a substantially vertical transport position and a bale-loading position; and means mounted on said frame member and operatively connected to one of said bale-engaging means and said bale-guiding means for moving the connected one of said means in a longitudinal direction relative to the other one of said means, whereby said engaged bale is transferred from said frame member into the plastic tubing.

10. The apparatus of claim 9 wherein said moving means moves said bale-supporting means in a longitudinal direction relative to said bale-guiding means.

11. The apparatus of claim 9 wherein said frame member includes:

a plurality of spaced-apart rails defining a longitudinal axis of said frame member with at least one of said rails adapted to guide longitudinal movement thereon; and at least one cross member having opposite ends with each said end being connected to a respective one of said spaced-apart rails.

12. The apparatus of claim 10 wherein at least one of said cross members has a concave configuration adapted for providing longitudinal passage of said engaged bale from said frame member into said bale-guiding means.

13. The apparatus of claim 11 wherein said bale-engaging means comprises a carriage member including:

a bulkhead member having opposite faces,
an upper end portion and a bottom end portion,
means for supporting said bulkhead member in a generally vertical attitude with respect to said frame member, and
means connected to said bulkhead member for selectively extending engagement of said carriage member with said engaged bale.

14. The apparatus of claim 13 wherein said carriage member is removably mounted on said at least one guide rail and adapted to accommodate longitudinal movement of one of said carriage member and said frame member with respect to the other.

15. The apparatus of claim 14 wherein said moving means comprises:

a telescoping cylinder system mounted on said frame member and operatively connected to one of said carriage member and said bale-guiding means; and
means for automatically controlling said telescoping cylinder system.

16. The apparatus of claim 15 wherein said telescoping cylinder system includes:

a multi-stage fluid-power cylinder;
a ram housed in said cylinder;
a power return means including a valve member for operating said multi-stage fluid power cylinder system; and
means mounted on said frame member and made operative when weighted by a bale supported on said frame member for activating said valve member to operate said multi-stage fluid power cylinder.

17. The apparatus of claim 9 wherein said bale-guiding means comprises a structure including:
   opposite open ends;
   an exterior surface;
   adequate interior dimensions adapted to accommodate a bale;
   adequate length adapted for gathering a predetermined length of plastic tubing on said outer surface thereof; and
   means for pivotally mounting one of said opposite open ends of said bale-guiding means on said frame member for selective movement of said bale-guiding means between a transport position and a bale-loading position.

18. The apparatus of claim 17 wherein said bale-guiding means is removably mounted on said frame member.

19. The apparatus of claim 13 further comprising means selectively mounted adjacent said bale-guiding means for dispensing plastic tubing over one of opposite open ends of said bale-guiding means.

20. The apparatus of claim 19 wherein said plastic tubing dispensing means comprises a roll-support device.

21. The apparatus of claim 20 wherein said roll-support device includes:
   a substantially vertical portion adapted for selectively mounting said device adjacent said bale-guiding means; and
   a horizontal portion supported by said vertical portion for delivering a predetermined length of plastic tubing over one of said opposite open ends of said bale-guiding means.

22. Apparatus for loading bales into plastic tubing comprising:
   a transportable base member including:
      at least one wheel,
      at least one axle rotatively supporting said wheel, and
      an elongate frame member mounted on said axle and adapted for sequentially supporting and transferring round bales into plastic tubing, said frame member having a plurality of spaced-apart rails defining the longitudinal axis of said frame member, with at least one of said spaced-apart rails adapted for providing guided longitudinal movement thereon, and at least one cross member having opposite ends with each of said ends being rigidly connected to a respective one of said spaced-apart rails;
   a carriage member selectively mounted on said frame member for engaging said supported bale and including:
      a bulkhead member having opposite faces,
      an upper end portion and a bottom end portion,
      means for supporting said bulkhead member in a generally vertical attitude with respect to said frame member,
      means connected to said bulkhead member for selectively extending engagement of said carriage member with the bale, and
      means for removably mounting said carriage member on said at least one guide rail and for accommodating guided longitudinal movement of one of said carriage member and said frame member relative to the other whereby the engaged bale is urged to load into the plastic tubing;
   means selectively mounted on said frame member for guiding the engaged bale into the plastic tubing, means for mounting said bale-guiding means for selective movement between a substantially vertical transport position and a bale-loading position;
   means mounted on said frame member and operatively connected to one of said carriage member and said bale-guiding means for moving the connected one of said carriage member and said bale-guiding means in a longitudinal direction relative to the other, whereby the engaged bale is transferred from said frame member into the plastic tubing; and
   means selectively mounted adjacent said bale-guiding means for dispensing plastic tubing over one of opposite open ends of said bale-guiding means.

23. Apparatus for loading bales into plastic tubing, comprising:
   a transportable base member including:
      at least one wheel;
      at least one axle rotatively supporting said wheel; and
      an elongated frame member mounted on said axle and adapted to sequentially support and transfer round bales into plastic tubing, said frame member having a plurality of spaced-apart rails defining the longitudinal axis of said frame member, with at least one of said spaced-apart rails adapted for providing guided longitudinal movement thereon, and at least one cross member having opposite ends with each of said ends being connected to a respective one of said spaced-apart rails;
   a carriage member selectively mounted on said frame member for engaging a bale supported thereon, said carriage member including:
      a bulkhead member having opposite faces,
      an upper end portion and a bottom end portion,
      means for supporting said bulkhead member in a generally vertical attitude with respect to said frame member,
      a bale ejector connected to said bulkhead member and adapted for selective movement between a vertical position and a bale-ejecting position for selectively extending engagement with said engaged bale, and
      means for removably mounting said carriage member on said at least one guide rail and for accommodating guided longitudinal movement of one of said carriage member and said frame member relative to the other;
   means selectively mounted on said frame member and for guiding said engaged bale into the plastic tubing, means for mounting said bale-guiding means for selective movement between a substantially vertical transport position and a substantially horizontal bale-loading position;
   means mounted on said frame member and operatively connected to one of said carriage member and said bale-guiding means for moving the connected one of said carriage member and said bale-guiding means in a longitudinal direction relative to the other, whereby said engaged bale is transferred from said frame member into the plastic tubing; and
   means selectively mounted adjacent said bale-guiding means for dispensing plastic tubing over one of opposite open ends of said bale-guiding means.

* * * * *

UNITED STATES PATENT AND TRADEMARK OFFICE
CERTIFICATE OF CORRECTION

PATENT NO. : 4,594,836

DATED : June 17, 1986

INVENTOR(S) : Maynard L. Good

It is certified that error appears in the above—identified patent and that said Letters Patent is hereby corrected as shown below:

Col. 2, line 17, delete "invention'increased" and substitute therefor --invention's increased--.

Claim 4, col. 11, line 8, delete "connetted" and substitute therefor --connected--;

Claim 4, col. 11, line 21, delete "." and substitute therefor --,--.

Claim 5, col. 11, line 42, delete "of" (first occurrence) and substitute therefor --on--.

Claim 9, col. 14, line 9, after "a" insert --substantially horizontal--;
col. 14, line 31, delete "10" and substitute therefor --11--.

Claim 22, col. 16, line 5, after "a" insert --substantially horizontal--.

Signed and Sealed this

Eighteenth Day of November, 1986

Attest:

DONALD J. QUIGG

Attesting Officer

Commissioner of Patents and Trademarks